United States Patent
Kiiski et al.

Patent Number: 6,144,340
Date of Patent: Nov. 7, 2000

[54] METHOD OF DETERMINING TRANSMISSION DIRECTION, AND A RADIO SYSTEM

[75] Inventors: Matti Kiiski, Oulunsalo; Iikka Keskitalo; Sakari Vikamaa, both of Oulu, all of Finland

[73] Assignee: Nokia Networks Oy, Espoo, Finland

[21] Appl. No.: 09/439,624

[22] Filed: Nov. 12, 1999

Related U.S. Application Data

[63] Continuation of application No. PCT/FI98/00415, May 15, 1998.

[30] Foreign Application Priority Data

May 16, 1997 [FI] Finland ................................... 972109

[51] Int. Cl.$^7$ .................................................... H01Q 3/22
[52] U.S. Cl. .......................................... 342/371; 455/424
[58] Field of Search ................................... 342/368, 371, 342/373; 455/422, 424–426

[56] References Cited

U.S. PATENT DOCUMENTS

| | | |
|---|---|---|
| 5,230,081 | 7/1993 | Yamada et al. |
| 5,491,833 | 2/1996 | Hamabe ................................. 455/33.1 |
| 5,508,707 | 4/1996 | LeBlanc |
| 6,008,759 | 12/1999 | Tangemann et al. ................... 342/368 |

*Primary Examiner*—Thomas H. Tarcza
*Assistant Examiner*—Dao I. Phan
*Attorney, Agent, or Firm*—Alter Law Group, LLC

[57] ABSTRACT

The invention relates to a radio system and a method of determining the transmission direction. The radio system comprises at least one base station communicating with terminals within its area by emitting a radiation pattern extending over the whole cell area and directional radiation patterns covering only part of the cell area. The base station transmits base-station-related information on a common control channel to the terminals. In the solution of the invention, the base-station-related information transmitted by the base station comprises a general part and a beam-specific part. The base station uses the radiation pattern extending over the whole cell area when transmitting the general part. Each beam-specific part is transmitted by using a specific radiation pattern. The terminal detects one of more beam-specific parts from the information received from the base station and transmits information about the detection result to the base station, on the basis of which the base station decides which directional radiation pattern to use when communicating with the terminal. The invention enables fast determination of the terminal direction with respect to the base station.

13 Claims, 4 Drawing Sheets

METHOD OF DETERMINING TRANSMISSION DIRECTION, AND A RADIO SYSTEM

This application is continuation of PCT/FI98/00415, filed May 15, 1998.

FIELD OF THE INVENTION

The invention relates to a method of determining the transmission direction in a radio system comprising at least one base station communicating with terminals within its area by emitting a radiation pattern extending over the whole cell area and directional radiation patterns covering only part of the cell area, and that the base station transmits base-station-related information on a common control channel to the terminals.

BACKGROUND OF THE INVENTION

The present invention can be applied to radio systems using directional antenna beams. The directional antenna beams are usually narrow beams pointing in a determined direction. The beams can be either fixedly directed, whereby the coverage area of a base station is covered by several radially directed beams, or, alternatively, the beams can be directed towards a particular terminal or particular terminals, and, in that case, if the terminal moves, the beam follows the location of the terminal. The method in which the users are distinguished from each other on the basis of their location is called an SDMA (Space Division Multiple Access) method. For this purpose, adaptive antenna arrays, i.e. phased antennas, and processing of the received signal enabling the mobile stations to be monitored are typically used in the base station. The SDMA enables the signal-to-interference ratio or the signal-to-noise ratio to be improved, for example in the base stations of mobile telephone systems.

A problem in the use of SDMA methods is how to determine subscriber terminal directions for the transmission of the base station. The narrower the beams desired to be used, the more accurate must be the direction determination. Narrowing the beams is, in turn, profitable, since it reduces disturbances.

It is previously known to determine the direction on the basis of a signal transmitted by the subscriber station and received by the base station, assuming that the radio channel is sufficiently similar in both transmission directions. Accurate determination of the direction in such a manner takes rather a long time, since interference and fading on the transmission path cause inaccuracy whose elimination requires the averaging of results. On the other hand, direction determination should be performed as fast as possible. This is essential particularly in fast packet-switched radio systems, since connections must be established fast, reliably and without spending frequency resources.

BRIEF DESCRIPTION OF THE INVENTION

An object of the invention is thus to provide a method and a radio system implementing the method to solve the above mentioned problems. This is achieved with the method of the type presented in the introduction, characterized in that the base-station-related information transmitted by the base station comprises a general part and a beam-specific part, and that the base station uses the radiation pattern extending over the whole cell area when transmitting the general part, and that each beam-specific part is transmitted by using a specific radiation pattern, and that the terminal detects one or more beam-specific parts from the information received from the base station and transmits information on the detection result to the base station, and that the base station decides, on the basis of the information, which directional radiation pattern to use when communicating with the terminal.

The invention further relates to a radio system comprising at least one base station communicating with terminals within its area, which base station comprises means for emitting a radiation pattern extending over the whole cell area and directional radiation patterns covering only part of the cell area, and means for transmitting base-station-related information on a common control channel to the terminals. The radio system of the invention is characterized in that the base station is arranged to transmit base-station-related information comprising a general part and a beam-specific part, and that the base station comprises means for using the radiation pattern extending over the whole cell area when transmitting the general part and means for transmitting each beam-specific part by using a specific directional radiation pattern, and that the terminal comprises means for detecting one or more beam-specific parts from the information received from the base station and means for transmitting information about the detection result to the base station, and that the base station comprises means for deciding, on the basis of the information, which directional radiation pattern to use when communicating with the terminal.

The preferred embodiments of the invention are disclosed in the dependent claims. The invention is based on the fact that a subscriber station receives a signal, usually a control channel, transmitted by a base station. In the solution of the invention, the direction in which the base station should transmit in order to enable a narrow-beam connection to the subscriber terminal can be inferred from this signal.

The method and system of the invention provide many advantages. The solution of the invention enables faster and more reliable determination of a terminal direction than before.

BRIEF DESCRIPTION OF THE DRAWINGS

In the following, the invention will be described in more detail by means of preferred embodiments with reference to the accompanying drawings, in which.

DETAILED DESCRIPTION OF THE INVENTION

Figure 1:
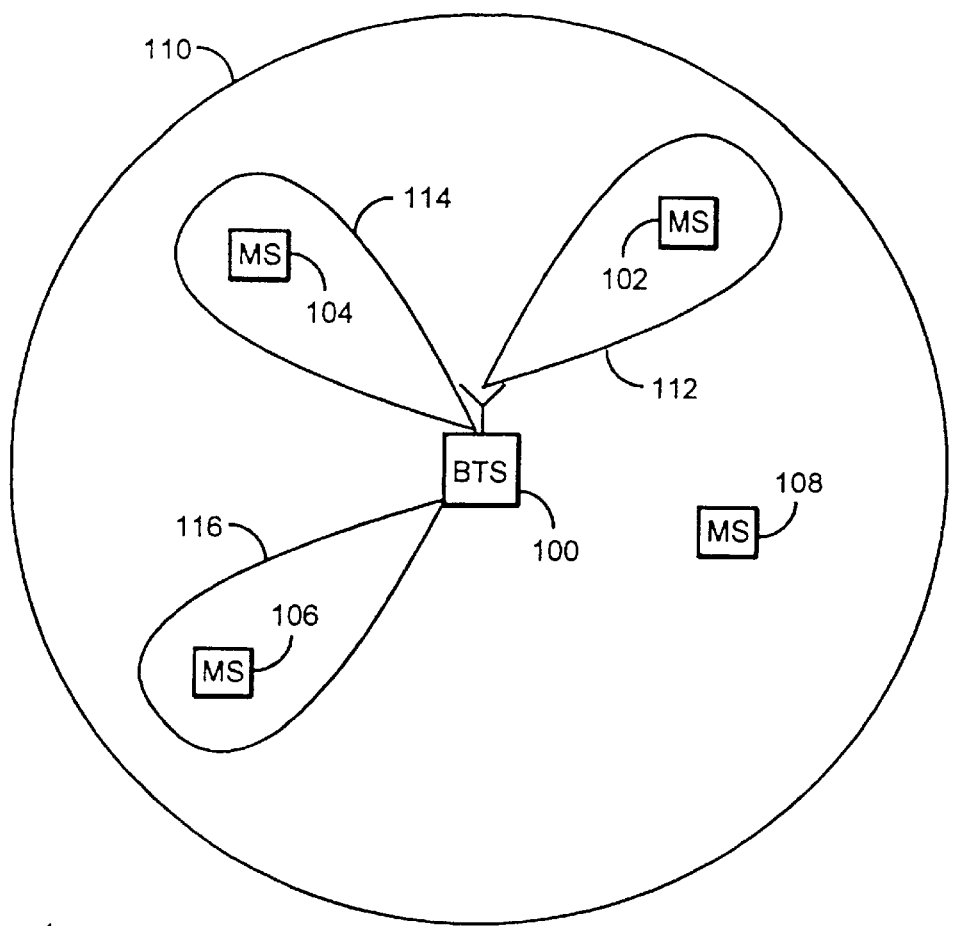
FIG. 1 shows a system to which the invention can be applied.

Let us first take a closer look at FIG. 1 illustrating an example of a cell in the radio system of the invention. The system comprises a base station 100 and a number of subscriber terminals 102–108 within each cell. In the situation according to FIG. 1, a call is in progress in the subscriber terminals 102–106, and the base station transmits a traffic channel signal to the terminals by using narrow-beam radiation patterns 112–116. The terminal 108 does not actively communicate with the base station.

On a typical subscriber-specific traffic channel, the aim is to obtain a beam that is as narrow as possible so as to direct the transmission to a small area and to avoid interference with other connections. Besides traffic channels, base stations transmit base-station-related information on control and paging channels, the information being used by the terminals for identifying the base station and the used frequency bands by means of which the terminals can transmit a connection set-up message to the base station. Narrow beams cannot be used on these channels, but the transmission must be directed to the whole cell area. In the example in FIG. 1, the base station 100 transmits control channels over the whole cell area by means of an omnidirectional radiation pattern 110. It is to be noted that antenna beams are in practice seldom distinct narrow beams as shown in FIG. 1, but, depending on the structure of the antenna, radiation patterns usually comprise several maximum and minimum points, i.e. several beams varying in size. A radiation pattern may comprise a main beam and a number of small side lobes that, depending on the application, may or may not be utilized in a transmission.

Figure 2A:
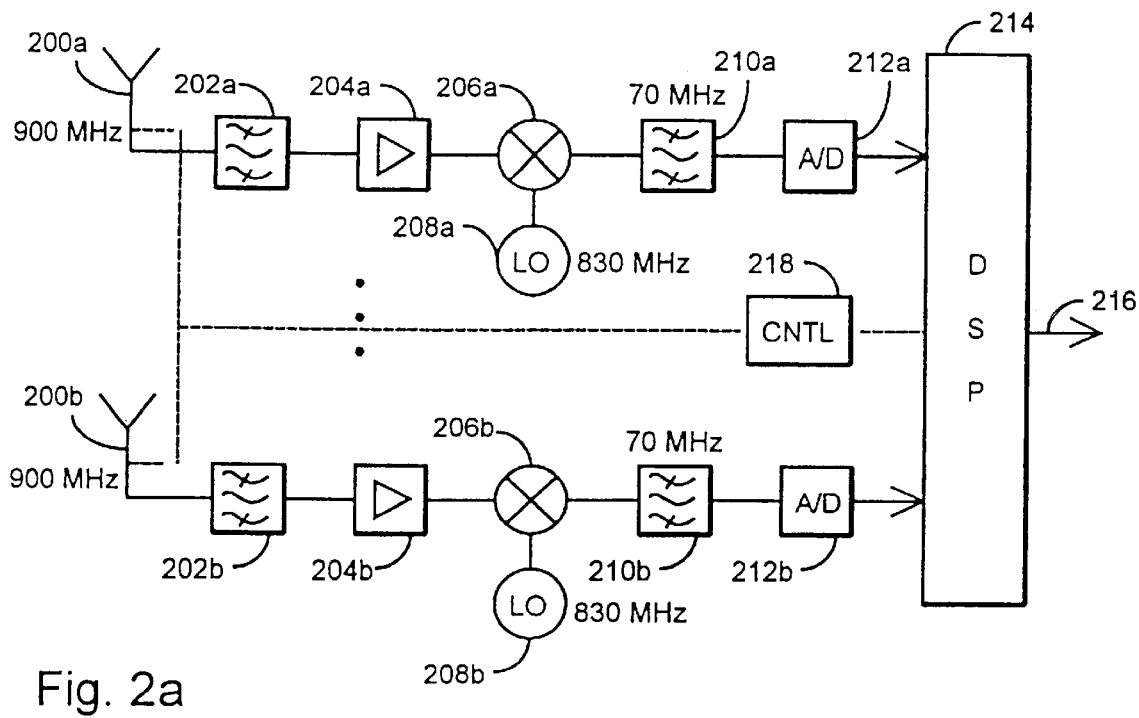
FIGS. 2a and 2b are block diagrams showing an example of the structure of the reception side and the transmission side in a base station used in the system of the invention.
Figure 2B:
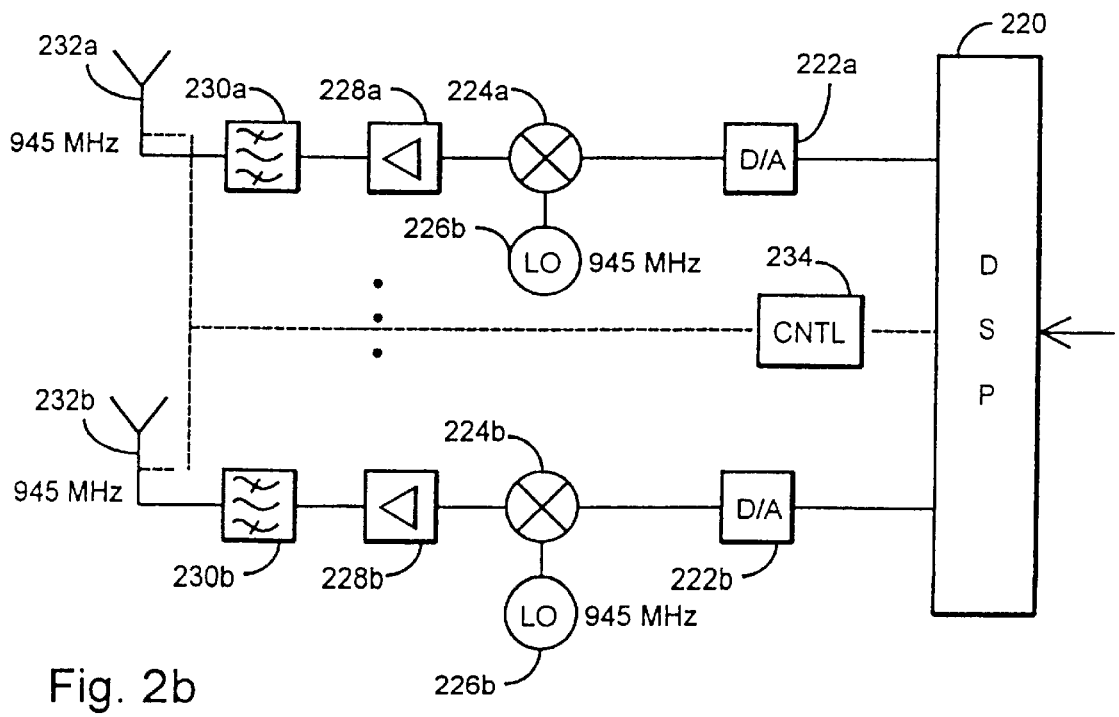

Let us next have a closer look at the block diagrams presented in FIGS. 2a and 2b showing an example of the structure of a base station used in the system of the invention. The base station comprises a number of parallel transmitters and receivers, or radio frequency parts thereof, and common signal processing blocks. FIG. 2a illustrates the structure of the base station in the reception direction. The base station comprises antenna means 200a, 200b used for receiving a subscriber terminal signal from the desired direction. The signal received by the antennas is applied to band-pass filters 202a, 200b and to intermediate amplifiers 204a, 204b. From the amplifiers, the signal is applied to a mixer 206a, 206b where it is multiplied by the output frequency of a local oscillator 208a, 208b, whereby the signal can be converted into a lower frequency. The converted signal is applied via filters 210a, 210b to A/D converters 212a, 212b converting the signal from analog to digital form. The digitized signal is forwarded to a signal processor 214, where it can be further processed as desired. The processing may include for example de-interleaving and decoding, as is obvious to those skilled in the art. A signal 216 is forwarded from the signal processor to other parts of the base station. The base station also comprises processor means 218 controlling the operation of the other parts of the base station, for example the phasing of the antennas in the desired direction at a given time. The processor means 218 can be implemented by a general purpose processor or a signal processor, or by discrete logic.

FIG. 2b illustrates the structure of the base station in the reception direction. The base station comprises a signal processor 220 where a signal is processed in the desired manner. From the processor, the signal is applied to a D/A converter 222a, 222b where the signal is converted into analog form. From the converter, the analog signal is applied to a mixer 224a, 224b where it is multiplied by the output frequency of a local oscillator 226a, 226b, whereby the signal can be converted into a higher frequency. From the mixer, the signal is applied via an amplifier 228a, 228b and a band-pass filter 230a, 230b to antenna means 232a, 232b used for transmitting the signal. The base station also comprises processor means 234 controlling the operation of the other parts of the base station, for example the phasing of the antennas in the desired direction at a given time. The processor means 234 can be implemented by a general purpose processor or a signal processor, or by discrete logic.

In an SDMA base station, a phase-controlled antenna array is usually used as the antenna means 200a, 200b, 232a, 232b, but separate antennas can also be used. An SDMA radio apparatus together with the antennas form an adaptive radiation pattern whose amplification and beamwidth depend on, for example, the number of antenna elements, i.e. emitters, used. The greater the number of elements in the antenna array, the narrower the beam and the greater the amplification achieved. In the base station of the invention, the phasing of the antennas can be implemented in known manners.

Figure 3:
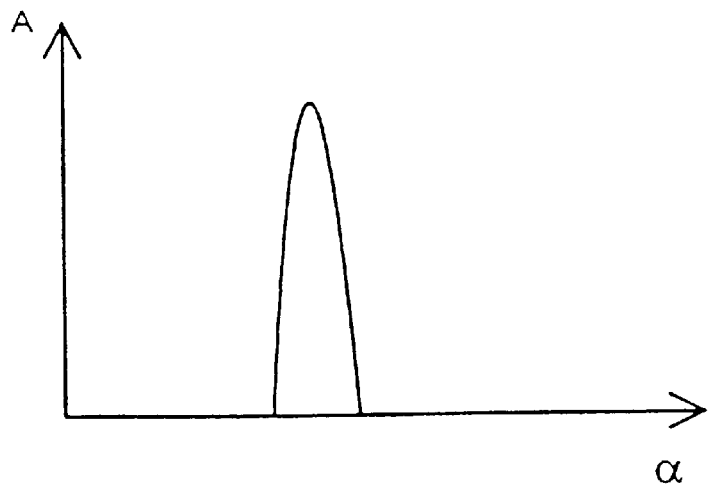
FIG. 3 illustrates a typical beam shape of a base station on a traffic channel.

FIG. 3 illustrates a typical beam shape in a base station on one traffic channel. In the figure, the horizontal axis shows angle and the vertical axis shows amplitude. The presented beam thus corresponds to any of the radiation patterns 122–116 presented in FIG. 1. The aim is to obtain the narrowest possible radiation beam for the traffic channel. However, a radiation pattern extending over the whole cell area is needed for the control channels.

Figure 4A:
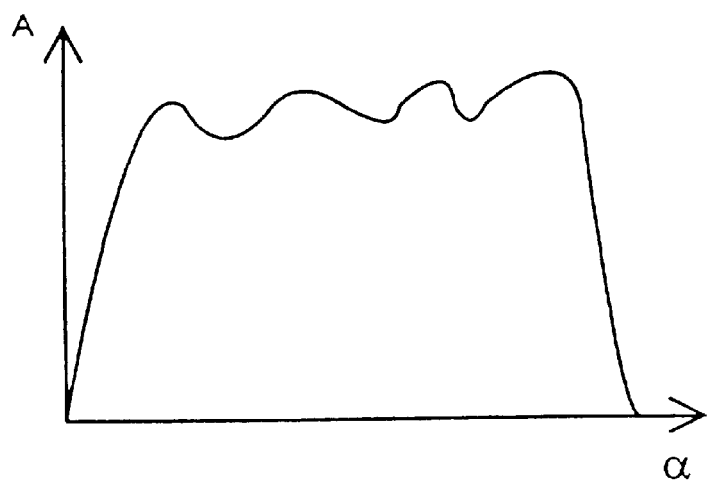
FIGS. 4a and 4b illustrate typical beam shapes of a base station.
Figure 4B:
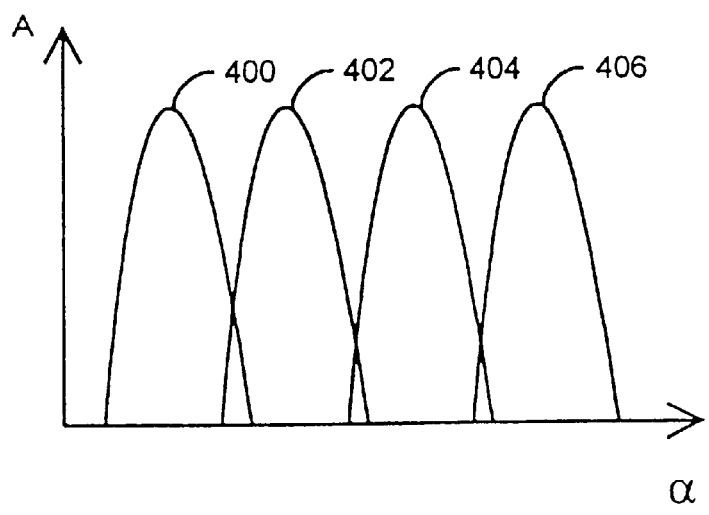

In that case, the use of several antenna elements is also possible by phasing the signals in a suitable manner, and an antenna pattern can then be identical to the one presented in FIG. 4a. In the figure, axes have the same significance as in FIG. 3. FIG. 4b, in turn, illustrates simultaneous transmission of several traffic channels by means of directional beams. The figure shows four beams 400–406 pointing in different directions. Simultaneous transmission of separate beams is successful if beam-specific signals are independent, i.e. orthogonal.

Figure 5:
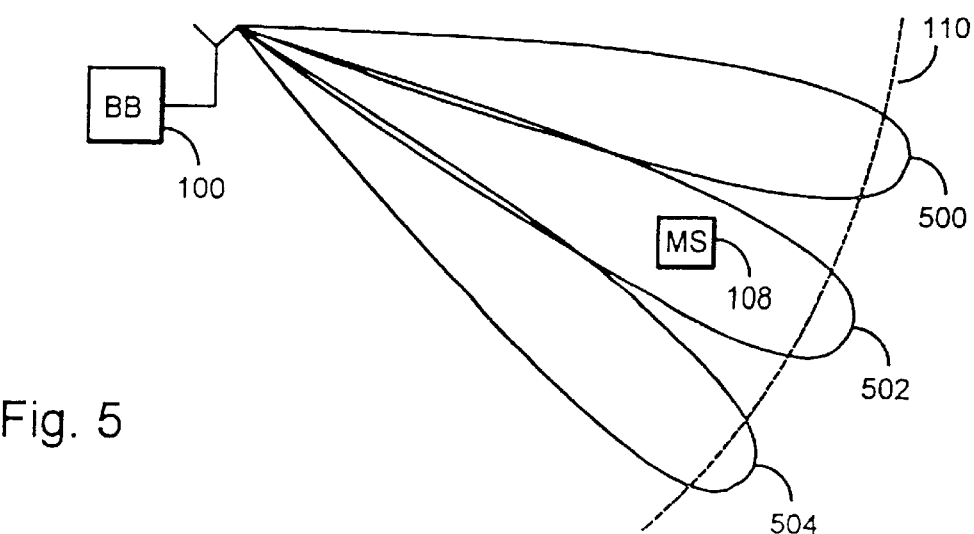
FIG. 5 illustrates an example of applying the method of the invention during connection set-up.

In the solution of the invention, the transmission manners according to FIGS. 4a and 4b are integrated in such a way that common information is transmitted in the transmission manner presented in FIG. 4a, and beam-specific information in the transmission manner presented in FIG. 4b. FIG. illustrates an example of applying the method of the invention during connection set-up. Referring to FIG. 1, it is assumed that the terminal 108 desires to set up a call. The base station 100 transmits base-station-related information by means of the radiation pattern 110 directed to the whole cell area. The information also comprises a beam-specific part which is transmitted through each beam and is different within each beam. FIG. 5 illustrates three beams 500–504 falling close to the terminal 108. In other words, each beam transmits a signal that comprises a portion different from the others. The terminal detects the base-station-related information received from the base station, and transmits information to the base station about the beam-specific parts it has detected. The base station can thus conclude the direction in which the terminal is located and the direction in which the beam intended for traffic channel transmission is to be directed. In the situation in the example of FIG. 5, the beam 502 can be heard best by the terminal. The terminal can transmit information to the base station about one or more beam-specific identifiers it has detected. The terminal does not necessarily have to know that the information it has received is beam-specific, but can echo the beam-specific information it has received, for example by using the received training sequence in its transmission.

Figure 6A:
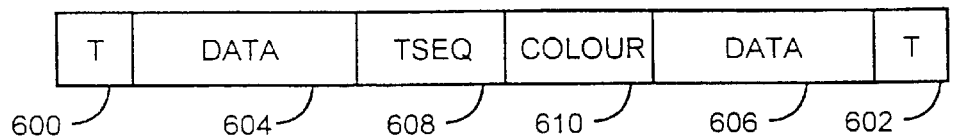
FIGS. 6a and 6b show examples of frame structures used in the system of the invention.

According to a preferred embodiment, the base station transmits base-station-related information in frame-structured form. In that case the frame comprises a general part and a beam-specific part. When transmitting the general part of the frame, the base station uses a radiation pattern extending over the whole cell area. Each beam-specific part of the frame is transmitted using a specific narrow-beam radiation pattern. This is illustrated in FIG. 6, showing an example of the frame structure used in the system of the invention. The frame comprises start and end bits 600, 602, actual information 604, 606, a training sequence 608 and a colour code 610. The transmission manner presented in FIG. 4a is used in all other blocks except when the colour code 610 is transmitted. The colour code 610 is a beam-specific identifier which is transmitted according to the transmission manner presented in FIG. 4b. The colour codes are preferably formed from mutually orthogonal code sequences to ensure reliable detection by the terminal. A sufficient, but limited number of colour codes is required.

The subscriber terminal detects the colour code for example by correlating the received signal with each colour code. The best correlation result shows the beam from which the strongest signal can be received. Obtaining two or more good correlation results indicates that the angular scattering of the radio environment is great, and the base station should use a wider transmission beam. The terminal can inform the base station of the best beam or beams that the base station can use when setting up a subscriber-specific connection with the terminal. The terminal can also inform the base station of the correlation results suitably quantized, whereby the base station can make decisions independently about a suitable beam direction and width.

If code division multiple access is used in the system, the beam-specific part can be implemented by each beam-specific part being composed of a different spreading code. An alternative is also to transmit the general part and the beam-specific parts by using the same spreading code, but in different phases. In that case, the terminal distinguishes the transmission on the basis of the phase difference. In other words, the terminal measures the code phase shift between a narrow-beam transmission and a wide-beam transmission.

Figure 7:
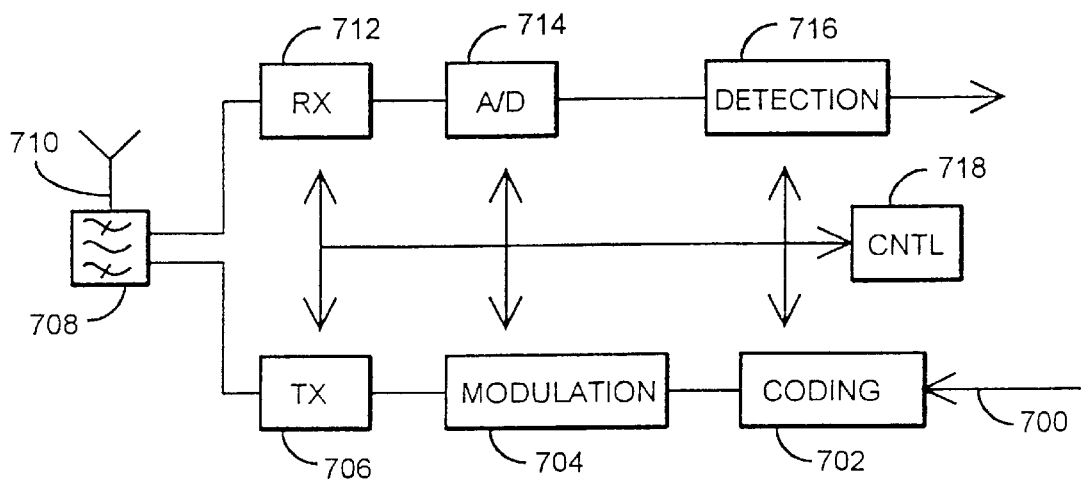
FIG. 7 is a block diagram illustrating an example of a subscriber terminal structure of the system of the invention.

Let us next have a closer look at FIG. 7 showing an example of the structure of the subscriber terminal used in the radio system of the invention. In transmitter direction, the subscriber terminal comprises means for coding 702 a signal 700 to be transmitted, the output of the means being operationally connected to the input of modulation means 704 whose output signal is applied to a transmitter unit 706. In the transmitter unit, the signal is transferred to a radio frequency and amplified. The signal is applied from the transmitter unit to an antenna 710 via a duplex filter 708.

In receiver direction, the subscriber terminal further comprises a receiver unit 712 to which the signal received by the antenna 710 is applied via the duplex filter 708. The signal received is converted in the receiver unit 712 into an intermediate frequency, and the output signal of the unit is operationally connected to the input of converter means 714. In the converter means, the signal is converted into digital form. The converted signal is applied to detector means 716 where the base-station-related information received from the base station is detected. The apparatus further comprises control and calculation means 718 controlling the operation of the other blocks mentioned above. The control and calculation means are typically implemented by a processor or by discrete logic.

The control processor, in addition to the detector means, detects the beam-specific parts and transmits information to the base station by using the means 702–706 on the transmitter side.

Figure 6B:
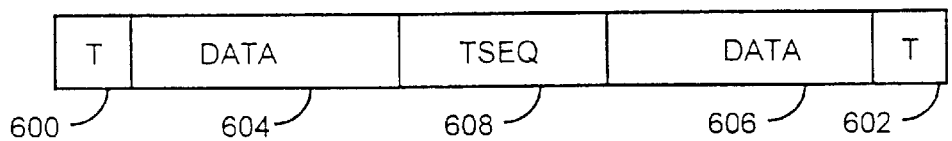

According to an embodiment of the invention, the training sequence included in a frame is used as the beam-specific part. This is illustrated in FIG. 6b. In this case, the frame comprises start and end bits 600, 602, actual information 604, 606, and a training sequence 608. This provides the advantage that a longer sequence leading to better correlation properties is obtained. A disadvantage is that all the training sequences must be gone through, whereby the calculation requires more resources.

Although the invention is described above with reference to the example according to the accompanying drawings, it is obvious that the invention is not restricted thereto but can be modified in many ways within the scope of the inventive idea presented in the attached claims.

What is claimed is:

1. A method of determining the transmission direction in a radio system comprising at least one base station (100) communicating with terminals (102–106) within its area by emitting a radiation pattern extending over the whole cell area (110) and directional radiation patterns covering only part of the cell area (112–116), and that the base station transmits base-station-related information on a common control channel to the terminals, characterized in that the base-station-related information transmitted by the base station comprises a general part and a beam-specific part, and that the base station uses the radiation pattern (110) extending over the whole cell area when transmitting the general part, and that each beam-specific part is transmitted by using a specific radiation pattern (112–116), and that the terminal detects one or more beam-specific parts from the information received from the base station and transmits information about the detection result to the base station, and that the base station decides, on the basis of the information, which directional radiation pattern to use when communicating with the terminal.

2. A method as claimed in claim 1, characterized in that the beam-specific part of the base-station-related information transmitted by the base station comprises a code that is different in each directional radiation pattern transmitted by the base station.

3. A method as claimed in claim 1, characterized in that the terminal transmits information to the base station about one or more detected beam-specific identifiers.

4. A method as claimed in claim 1, characterized in that the base station transmits base-station-related information in frame-structured form, and that the frame comprises a general part and a beam-specific part, and that the base station uses the radiation pattern extending over the whole cell area when transmitting the general part of the frame, and that each beam-specific part of the frame is transmitted by using a specific directional radiation pattern.

5. A method as claimed in claim 4, characterized in that the frame comprises a training sequence used as the beam-specific part.

6. A method as claimed in claim 1, characterized in that the base station forms the radiation pattern extending over the whole cell area and the directional radiation patterns by means of an antenna array composed of several elements by phasing the signal to be transmitted via the antennas.

7. A method as claimed in claim 1, characterized in that the directional radiation patterns are narrowbeam radiation patterns.

8. A method as claimed in claim 1, characterized in that code division multiple access is used in the system.

9. A method as claimed in claim 8, characterized in that each beam-specific part is composed of a different spreading code.

10. A method as claimed in claim 8, characterized in that the general part and the beam-specific parts are transmitted by using the same spreading code, but in different phases.

11. A radio system comprising at least one base station communicating with terminals within its area, which base station comprises means (232a, 232b, 234) for emitting a radiation pattern extending over the whole cell area and directional radiation patterns covering only part of the cell area, and means (232a, 232b, 234, 220) for transmitting base-station-related information on a common control channel to the terminals, characterized in that the base station is arranged to transmit base-station-related information comprising a general part and a beam-specific part, and that the base station comprises means (232a, 232b, 234) for using the radiation pattern extending over the whole cell area when transmitting the general part and means (232a, 232b, 234) for transmitting each beam-specific part by using a specific directional radiation pattern, and that the terminal comprises means (716, 718) for detecting one or more beam-specific parts from the information received from the base station and means (702–706, 718) for transmitting information about the detection result to the base station, and that the base station comprises means (218, 234) for deciding, on the basis of the information, which directional radiation pattern to use when communicating with the terminal.

12. A radio system as claimed in claim 11, characterized in that the base station comprises an antenna array (200a, 200b, 232a, 232b) composed of several elements, and means (218, 234) for phasing the signal transmitted via the antennas in order to form the directional radiation patterns.

13. A radio system as claimed in claim 11, characterized in that the base station comprises means (220, 234) for forming the beam-specific part of the base-station-related information in such a way that it comprises a code that is different in each directional radiation pattern transmitted by the base station.

* * * * *

UNITED STATES PATENT AND TRADEMARK OFFICE
CERTIFICATE OF CORRECTION

PATENT NO. : 6,144,340
DATED : November 7, 2000
INVENTOR(S) : Kiiski et al.

Page 1 of 1

It is certified that error appears in the above-identified patent and that said Letters Patent is hereby corrected as shown below:

<u>Title page,</u>
Item [75], Inventors: Matti Kiiski, Oulunsalo, please replace "Iikka Keskitalo" with -- Ilkka Keskitalo--.

Signed and Sealed this

Twenty-ninth Day of January, 2002

Attest:

*Attesting Officer*

JAMES E. ROGAN
*Director of the United States Patent and Trademark Office*